United States Patent
Chen et al.

(10) Patent No.: US 10,108,310 B2
(45) Date of Patent: Oct. 23, 2018

(54) METHOD AND APPARATUS FOR ICON BASED APPLICATION CONTROL

(71) Applicant: MARVELL WORLD TRADE LTD, St. Michael (BB)

(72) Inventors: Jialin Chen, Shanghai (CN); Wenzhao Fang, Shanghai (CN); Ping Shen, Shanghai (CN); Xin Jiang, Shanghai (CN); Mingyang Wang, Anhui (CN)

(73) Assignee: MARVELL WORLD TRADE LTD, St. Michael (BB)

( * ) Notice: Subject to any disclaimer, the term of this patent is extended or adjusted under 35 U.S.C. 154(b) by 484 days.

(21) Appl. No.: 14/460,471

(22) Filed: Aug. 15, 2014

(65) Prior Publication Data
US 2015/0052464 A1 Feb. 19, 2015

Related U.S. Application Data

(60) Provisional application No. 61/866,812, filed on Aug. 16, 2013.

(51) Int. Cl.
*G06F 3/0481* (2013.01)
*G06F 3/0484* (2013.01)
*G06F 3/16* (2006.01)

(52) U.S. Cl.
CPC ...... *G06F 3/04817* (2013.01); *G06F 3/04847* (2013.01); *G06F 3/167* (2013.01)

(58) Field of Classification Search
CPC ... G06F 3/04817; G06F 3/167; G06F 3/04847
USPC .......................................................... 715/765
See application file for complete search history.

(56) References Cited

U.S. PATENT DOCUMENTS

| | | | | |
|---|---|---|---|---|
| 2009/0327978 A1* | 12/2009 | Hamadene | .......... | G06F 3/04883 715/863 |
| 2010/0085318 A1* | 4/2010 | Lee | ...................... | G06F 3/04883 345/173 |
| 2010/0269040 A1* | 10/2010 | Lee | ...................... | G06F 3/04817 715/702 |
| 2014/0136213 A1* | 5/2014 | Kim | ........................ | G06F 3/167 704/275 |
| 2014/0173747 A1* | 6/2014 | Govindaraju | ........... | G06F 21/53 726/27 |
| 2015/0199083 A1* | 7/2015 | Kuscher | ................ | G06F 3/0482 715/810 |

FOREIGN PATENT DOCUMENTS

CN 103092464 A 5/2013

OTHER PUBLICATIONS

Office Action dated Jun. 26, 2018 in Chinese Patent Application No. 201410414468.5 (with English translation), 11 pages.

\* cited by examiner

*Primary Examiner* — Tadeese Hailu
*Assistant Examiner* — Darrin Hope

(57) ABSTRACT

Aspects of the disclosure provide a method for icon based application control. The method includes receiving, by a processor, a detection signal indicative of a pre-defined user action on an icon in a graphical user interface (GUI). The icon has an associated application. Further, the method includes extracting adjustable settings of the associated application with the icon, and providing, by the processor, a setting interface for the icon in the GUI to enable adjustments of the settings for the application to be performed via the setting interface.

14 Claims, 5 Drawing Sheets

METHOD AND APPARATUS FOR ICON BASED APPLICATION CONTROL

INCORPORATION BY REFERENCE

This present disclosure claims the benefit of U.S. Provisional Application No. 61/866,812, "Method for Using Application Icon to Control Application Behaviors on Intelligent Device" filed on Aug. 16, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, an electronic device, such as a laptop computer, a tablet, a smart phone, and the like uses a graphical user interface (GUI) to allow a user to input commands and data and to receive results of operations performed within the electronic device.

SUMMARY

Aspects of the disclosure provide a method for icon based application control. The method includes receiving, by a processor, a detection signal indicative of a pre-defined user action on an icon in a graphical user interface (GUI). The icon has an associated application. Further, the method includes extracting adjustable settings of the associated application with the icon, and providing, by the processor, a setting interface for the icon in the GUI to enable adjustments of the settings for the application to be performed via the setting interface.

According to an aspect of the disclosure, the method further includes receiving, by the processor, detection signals indicative of user actions via the setting interface, and adjusting the settings according to the detection signals. Then, the method includes receiving, by the processor, another detection signal indicative of another pre-defined user action on the icon to execute the application associated with the icon, and executing the application according to the adjusted settings.

To provide, by the processor, the setting interface for the icon in the GUI to enable the adjustments of the settings for the application to be performed via the setting interface, in an example, the method includes providing a popup menu in association with the icon in the GUI to enable the adjustments of the settings for the application to be performed via the popup menu. In another example, the method includes providing, via the GUI, a mapping of pre-defined locations in the GUI with setting adjustments to enable a moving reaction of the icon to one of the pre-defined locations. In another example, the method includes providing a mapping of pre-defined gestures in the GUI with the setting adjustments to enable the setting adjustments via gesture detection. In another example, the method includes providing a mapping of pre-defined voices with the setting adjustments to enable the setting adjustments via voice recognition.

Aspects of the disclosure provide an electronic device that includes a memory and a processor. The memory is configured to store applications with associated settings. The processor is configured to receive a detection signal indicative of a pre-defined user action on an icon in a graphic user interface (GUI), extract adjustable settings of an application associated with the icon, and provide a setting interface for the icon in the GUI to enable adjustments of the settings for the application to be performed via the setting interface.

Aspects of the disclosure provide a non-transitory computer readable medium storing program instructions for causing a processor to execute operations for icon-based application control. The operations include receiving a detection signal indicative of a pre-defined user action on an icon in a graphical user interface (GUI). The icon has an associated application. Further, the operations include extracting adjustable settings of the associated application with the icon, and providing a setting interface for the icon in the GUI to enable adjustments of the settings for the application to be performed via the setting interface.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
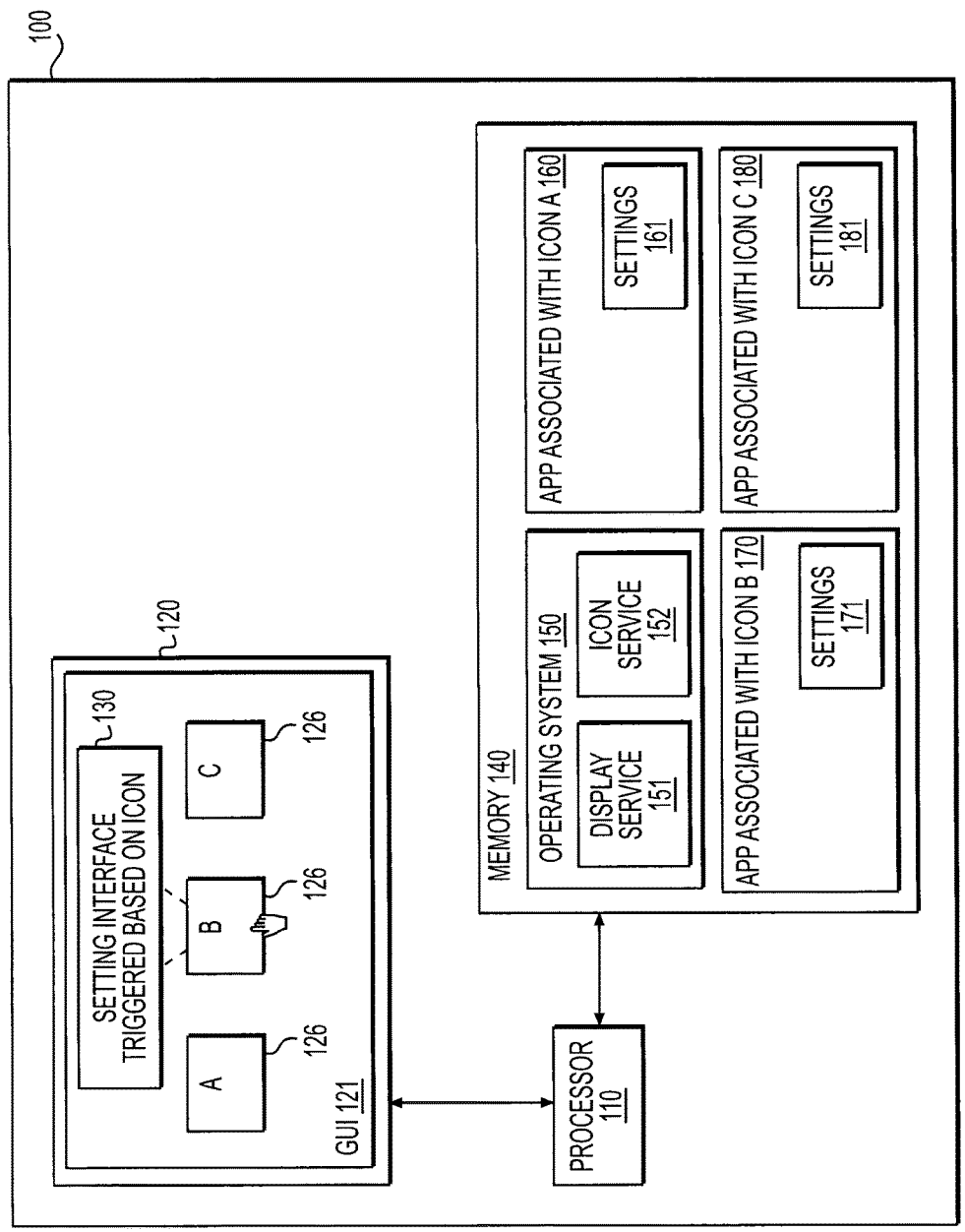
FIG. 1 shows a block diagram of an electronic device example 100 according to an embodiment of the disclosure.

FIG. 1 shows a block diagram of an electronic device example 100 according to an embodiment of the disclosure. The electronic device 100 includes a display 120 for providing a graphical user interface (GUI) 121, a memory 140 for storing data and software programs and a processor 110 for executing the software programs to process data. These elements are coupled together as shown in FIG. 1.

According to an aspect of the disclosure, an application software (App) stored in the memory 140 has adjustable settings for application behavior control. The application software can be executed by the processor 110 to behave differently according to the settings. In an embodiment, the settings are adjusted in a setting interface triggered based on a user reaction on an icon associated with the application software.

The electronic device 100 can be any suitable electronic device, such as a laptop computer, a desktop computer, a tablet computer, a smart phone, a smart television, and the like.

The display 120 can be implemented using any suitable visual display technology, such as cathode ray tube (CRT) technology, liquid crystal display (LCD) technology, plasma display technology, organic light-emitting diode (OLED) display technology, and the like. In an example, the display 120 is a touch screen display 120, and when a user uses a stylus, a pen and/or one or more fingers to react on what is displayed on the touch screen display 120, the touch screen display 120 detects the reactions. In another example, the display 120 is a non-touch screen display and the electronic device 100 includes other suitable user input components (not shown), such as a keyboard, a mouse, a trackpad, a joystick, a motion detector and the like to receive user reactions on what is displayed on the display 120.

In an embodiment, the processor 110 is implemented using integrated circuits. The processor 110 can have any suitable architecture, such as a complex instruction set computing (CISC) based architecture, a reduced instruction set computing based architecture, ARM architecture, and the like. In an embodiment, the processor 110 includes a single central processing unit (CPU). In another embodiment, the processor 110 is a multi-core processor with multiple independent central processing units (CPUs). In another example, the processor 110 includes multiple processing units, such as a CPU, a graphics processing unit, a packet processing unit, and the like. In an example, the multiple processing units are integrated on a single integrated circuit (IC) chip. In another example, the multiple processing units are on separate IC chips. The IC chips are assembled in a single chip package or are mounted on a single printed circuit board (PCB).

The processor 110 is configured to be able to access the memory 140. In an example, the processor 110 reads instruction codes and data from the memory 140, processes the data according to the instruction codes, and writes the processed data back to the memory 140. Further, the processor 110 is configured to provide visual signals and control signals to the display 120. The display 120 provides visual images to users according to the visual signals and the control signals.

When the display 120 is a touch screen display 120, the processor 110 also receives sensed signals corresponding to user reactions on what is displayed from the touch screen display 120. When the display 120 is a non-touch screen display, the processor 110 receives sensed signals corresponding to the user reactions from other user input components (not shown), such as a keyboard, a mouse, a trackpad, a joystick, a motion detector and the like.

The memory 140 can be implemented using any suitable memory technologies, such as read-only memory technology, dynamic random access memory (DRAM) technology, static random access memory (SRAM) technology, flash memory technology, hard disc drive technology, optical disc drive technology, and the like. In an embodiment, the memory 140 includes a first memory implemented using the SRAM technology, a second memory implemented using DRAM technology, and a third memory implemented using flash memory technology. In an example, the first memory is integrated with the processor 110 on a same IC chip, and the second memory and the third memory are on separate IC chips. The memories are suitably coupled with the processor 110, so that the processor 110 can access the memories.

According to an aspect of the disclosure, the memory 140 stores software programs that can be executed by the processor 110. In the FIG. 1 example, the memory 140 stores an operating system software 150, and a plurality of application software 160-180. The operating system software 150 includes instruction codes to be executed by the processor 110 to provide an operating system that manages hardware in the electronic device 100, such as the display 120, the memory 140, and the like, and to provide common services for the application software 160-180, such as a display service, an input service, an icon service, a memory service, and the like. In the FIG. 1 example, the operating system software 150 includes instruction codes 151 for providing a display service, and instruction codes 152 for providing an icon service. It is noted that the operating system software 150 can include other instruction codes (not shown) for other services.

According to an aspect of the disclosure, each of the application software 160-180 includes instruction codes to be executed by the processor 110 to perform tasks. Further, each of the application software 160-180 has respective settings that control the behavior for performing the tasks when the application software is executed by the processor 110. In an example, the settings for an application software include a network connection setting, a hide/view setting, a privacy setting, a music setting, a source setting, a color theme setting and the like.

According to an aspect of the disclosure, the operating system software 150 enables icon-based setting adjustments. Specifically, in an example, each application software has an associated icon, and the processor 110 executes the instruction codes 151 to display the icons 126 for the application software 160-180 in the GUI 121. In the FIG. 1 example, the application software 160 is associated with icon A, the application software 170 is associated with icon B and the application software 180 is associated with icon C.

Further, a pre-defined user reaction indicative of setting adjustments is detected. In an example, the display 120 is a touch screen display, and the operating system of the electronic device 100 defines two types of touch reactions on an icon based on a detected time duration of a touch on the icon. For example, when the detected time duration of a touch is shorter than a threshold, the touch belongs a first type of touch reaction, and when the time duration of a touch is longer than the threshold, the touch belongs to a second type of touch reaction. In an example, the first type of touch reaction on an icon is indicative of a user input to execute the application software associated with the icon, and the second type of touch reaction on the icon is indicative of a user input to adjust settings of the application software associated with the icon.

In an embodiment, when the processor 110 receives a detection signal indicative of a detection of the second type of touch reaction an icon, the processor 110 executes the instruction codes 152 to extract the settings of the application software associated with the icon and generate visual and control signals for a setting interface 130 to adjust the settings. Then, the processor 110 executes the instruction codes 151 to provide the visual and control signals for the setting interface 130 to the display 120. According to the visual signals and the control signals, the display 120 provides the setting interface 130 in the GUI 121.

Figure 3:
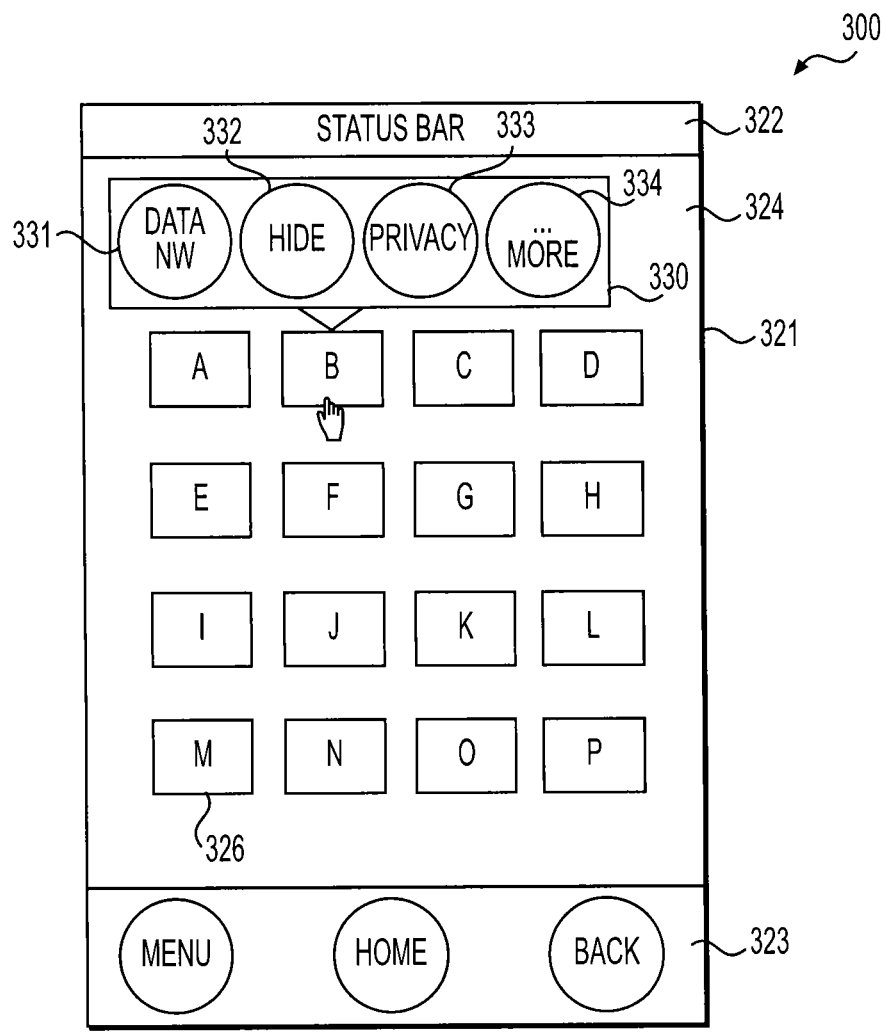
FIG. 3 shows a diagram of an electronic device example 300 according to an embodiment of the disclosure.
Figure 4:
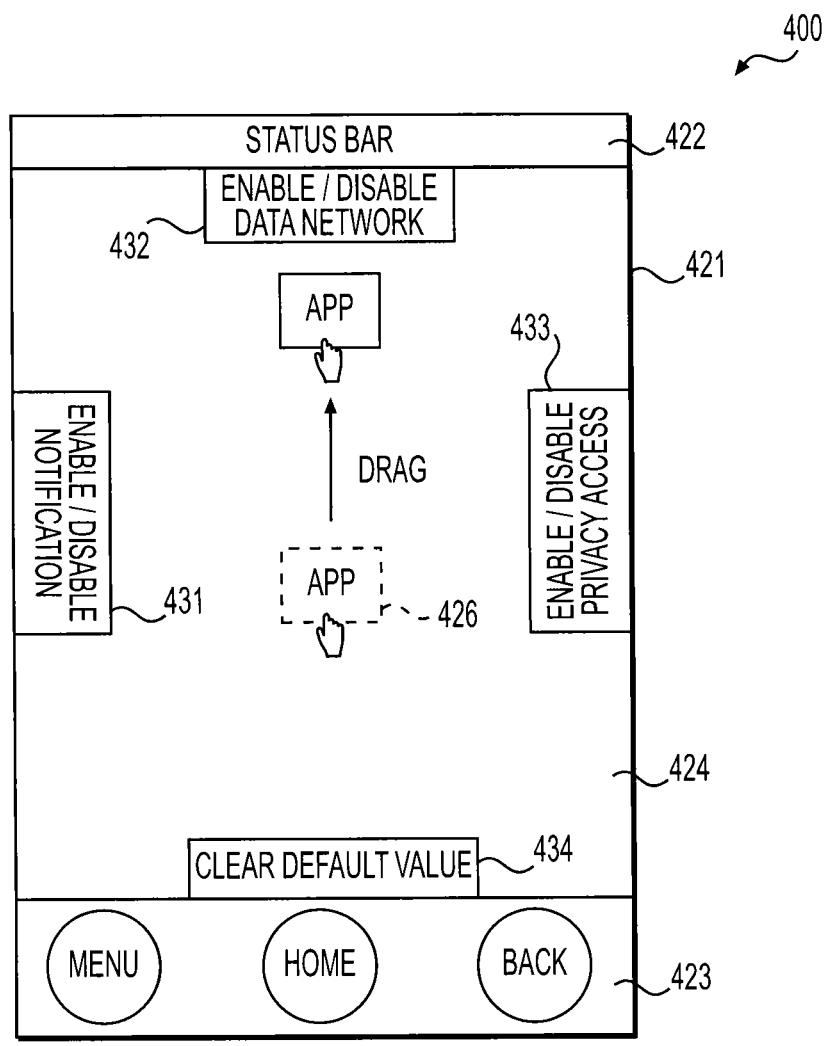
FIG. 4 shows a diagram of an electronic device example 400 according to an embodiment of the disclosure.
Figure 5:
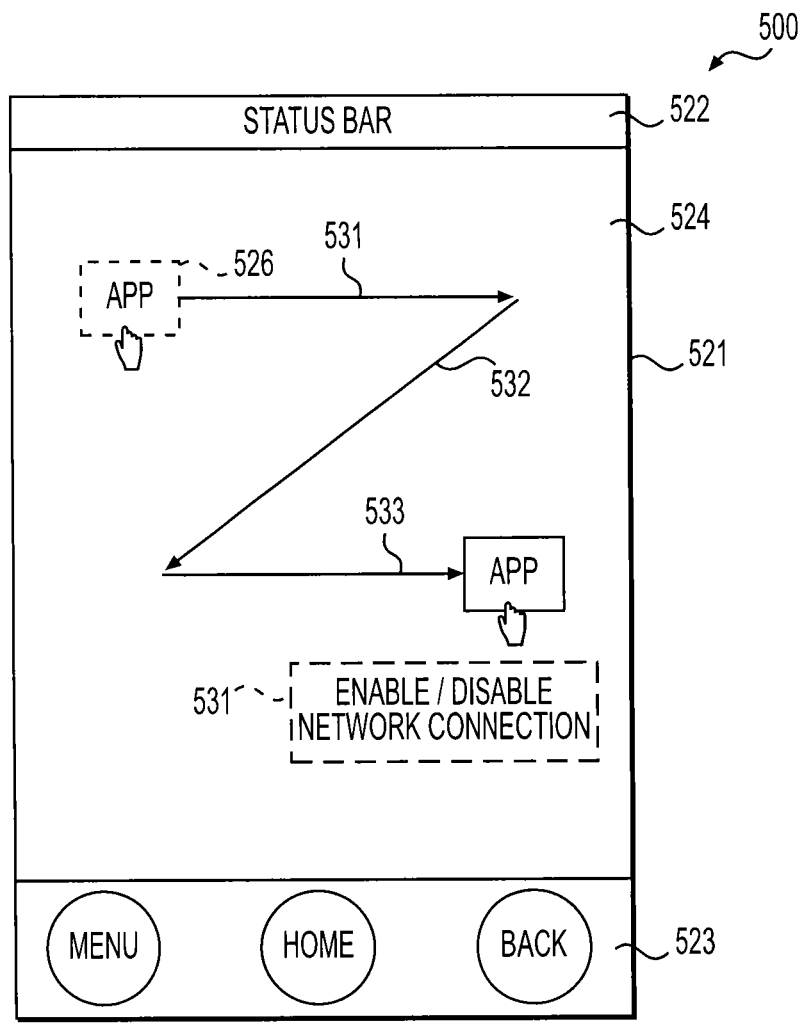
FIG. 5 shows a diagram of an electronic device example 500 according to an embodiment of the disclosure.

The setting interface 130 can be implemented using various techniques. FIGS. 3-5 show some of the techniques, and will be described later with reference to FIGS. 3-5.

Further, when user adjusts the settings of the application software via the setting interface 130, the touch screen display 120 detects the user reactions in the setting interface 130, and provides detection signals corresponding to the detected reactions of the user to the processor 110. The processor 110 then adjusts the settings for the application software according to the detection signals. The application software can be executed according to the adjusted settings. In an example, when the processor 110 receives a detection signal indicative of a detection of the first type of touch reaction the icon, the processor 110 executes the application software according to the adjusted settings.

Figure 2:
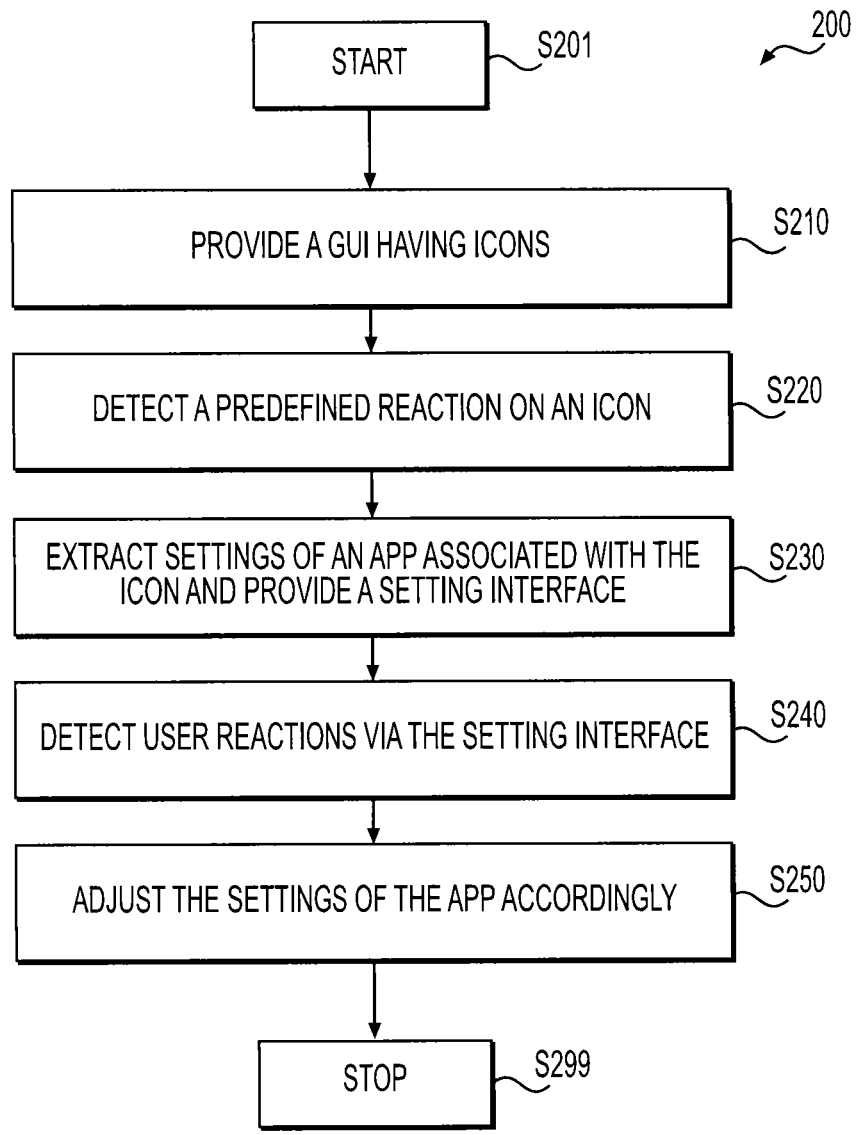
FIG. 2 shows a flow chart outlining a process example 200 according to an embodiment of the disclosure.

FIG. 2 shows a flow chart outlining a process example 200 according to an embodiment of the disclosure. In an example, the process 200 is executed in an operating system, such as the operating system provided by the processor 110 executing the operating system software 150. The process starts at S201, and proceeds to S210.

At S210, a graphical user interface (GUI) with icons is provided to a display. In the FIG. 1 example, the processor 110 executes the operating system software 150 to provide an operating system in the electronic device 100. In an example, each application software has an associated icon, and the processor 110 executes the code instructions 151 to provide visual signals for the icons 126 associated with the application software 160-180 and control signals to the display 120. According to the visual signals and the control signals, the display 120 provides the GUI 121 with the icons 126.

At S220, a pre-defined action on an icon is detected. In the FIG. 1 example, the display 120 is a touch screen display. In an example, when a user touches, for example the icon B, for a time duration longer than a threshold, the display 120 detects the second type of touch reaction. The second type of touch reaction on the icon B is indicative of a user input to adjust settings 171 of the application software 170 associated with the icon B. The display 120 provides a detection signal to the processor 110 to inform the operating system of the second type of touch reaction on icon B.

At S230, settings of an application software associated with the icon are extracted and are provided in a setting interface. In the FIG. 1 example, the processor 110 receives the detection signal and executes the instruction codes 152 to extracts the settings 171 for the application software 170 associated with the icon B and to generate visual signals and control signals for the setting interface 130 associated with icon B. Then, the processor 110 executes the instruction codes 151 to provide the visual signals and the control signals for the setting interface 130 to the display 120. According to the visual signals and the control signals, the display 120 provides the setting interface 130 in the GUI 121.

At S240, reactions in the setting interface are detected. In the FIG. 1 example, the display 120 detects reactions of the user in the setting interface 130, and provides detection signals corresponding to the detected reactions of the user to the processor 110.

At S250, the settings of the application are adjusted accordingly. In the FIG. 1 example, the processor 110 receives the detection signals corresponding to the detected reactions of the user, and adjusts the settings 171 of the application software 170 according to the detection signals. Then, the process proceeds to S299 and terminates.

It is noted that, after the setting adjustments, when the user touches the icon B with a time duration shorter than the threshold, the display 120 sends, to the processor 110, a detection signal indicative of a detection of the first type of touch reaction on the icon B. When the processor 110 receives the detection signal, the processor 110 executes the application software 170 according to the adjusted settings 171.

FIG. 3 shows a diagram of a graphical user interface (GUI) 321 in an electronic device 300 according to an embodiment of the disclosure. The electronic device 300 utilizes certain components (not shown), such as a processor (not shown), a memory (not shown), a display (not shown), that are identical or equivalent to those used in the electronic device 100; the description of these components has been provided above and will be omitted here for clarity purposes. The GUI 321 has a first portion 322 having a status bar to display the status of the electronic device 300, a second portion 323 having buttons (e.g., a menu button, a home button, and a back button) for root control, and a third portion 324 having icons A-P.

In the FIG. 3 example, when an icon, such as the icon B is touched for a time duration longer than a threshold, a setting interface, such as a popup menu 330, associated with the icon B appears in the GUI 321. The popup menu 330 is used to adjust settings for an application software associated with icon B. In the FIG. 3 example, the popup menu 330 includes a plurality of buttons associated with settings, such as a first button 331 for enabling/disabling data network connection, a second button 332 for hiding/viewing the icon B, a third button 333 for enabling/disabling privacy access, a fourth button 334 for other suitable settings, and the like. In an example, the settings are adjusted by touching the buttons in the popup menu 330. For example, when the privacy access setting for the application software is enabling the privacy access, and the user touches the third button 333, the privacy access setting for the application software is then changed to disabling the privacy access. When the application software is executed by the processor in the electronic device 300, the privacy access is disabled.

However, when the privacy access setting for the application software is disabling the privacy access, and the user touches the third button 333, the privacy access setting for the application software is then changed to enabling the privacy access. When the application software is executed by the processor in the electronic device 300, the privacy access is enabled.

FIG. 4 shows a diagram of a graphical user interface (GUI) 421 in an electronic device 400 according to an embodiment of the disclosure. The electronic device 400 utilizes certain components (not shown), such as a processor (not shown), a memory (not shown), a display (not shown), that are identical or equivalent to those used in the electronic device 100; the description of these components has been provided above and will be omitted here for clarity purposes. The GUI 421 has a first portion 422 having a status bar to display the status of the electronic device 400, a second portion 423 having buttons (e.g., a menu button, a home button, and a back button) for root control, and a third portion 424 having a setting interface for an icon 426.

In an example, when the icon 426 is touched for a time duration longer than a threshold, the third portion 424 provides a mapping of pre-defined locations in the GUI 421 with setting adjustments as shown in FIG. 4. For example, the GUI 421 displays four locations associated with setting adjustments for the application software associated with the icon 426, such as a first location 431 for enabling/disabling notification, a second location 432 for enabling/disabling data network, a third location 433 for enabling/disabling privacy access, a fourth location 434 for clear default value, and the like. In an example, the settings are adjusted by dragging the icon 426 to one of the pre-defined locations.

For example, when the data network setting of the application software is enabling the data network, and the user drags the icon 426 to the second location 432, the data network setting of the application software is changed to disabling the data network. When the application software is executed by the processor in the electronic device 400, the data network is disabled.

However, when the data network setting of the application software is disabling the data network, and the user drags the icon 426 to the second location 432, the data network setting of the application software is changed to enabling the data network. When the application software is executed by the processor in the electronic device 400, the data network is enabled.

FIG. 5 shows a diagram of a graphical user interface (GUI) 521 in an electronic device 500 according to an embodiment of the disclosure. The electronic device 500 utilizes certain components (not shown), such as a processor (not shown), a memory (not shown), a display (not shown), that are identical or equivalent to those used in the electronic device 100; the description of these components has been provided above and will be omitted here for clarity purposes. The GUI 521 has a first portion 522 having a status bar to display the status of the electronic device 500, a second portion 523 having buttons (e.g., a menu button, a home button, and a back button) for root control, and a third portion 524 having a setting interface for an icon 526.

In an example, when the icon 526 is touched for a time duration longer than a threshold, the third portion 524 provides a mapping of pre-defined gestures in the GUI 521 with setting adjustments for an application software associated with the icon 526 as shown in FIG. 5. For example, the GUI 521 displays gestures associated with setting adjustments, such as a gesture formed by arrow lines 531-533 for enabling/disabling network connection. In an example, the settings are adjusted by performing the gestures on the touch screen display in the electronic device 500 that provides the GUI 521.

For example, when the network connection setting for the application software is enabling the network connect, and the user drags the icon 526 to perform a gesture "Z" on the touch screen display, the network connection setting for the application software is changed to disabling the network connection. When the application software is executed by the processor in the electronic device 500, the network connection is disabled.

However, when the privacy access setting for the application is disabling network connection, and the user drags the icon 526 to perform a gesture "Z" on the touch screen display, the privacy access setting is changed to enabling the network connection. When the application software is executed by the processor in the electronic device 500, the network connection is enabled.

It is noted that other suitable mappings, such as a mapping of voices with setting adjustments, and the like can be used. In an embodiment, when an icon, such as the icon 526, is touched for a time duration longer than a threshold, a mapping of words with setting adjustments is provided in the GUI 521. The electronic device 500 includes a microphone (not shown). When a user determines to change a setting adjustment, the user speaks the word mapping to the setting adjustment. The microphone then captures the voice and converts the voice into electrical signal. In an example, the electronic device 500 is installed with a voice recognition software to be executed by the processor in the electronic device 500 to recognize the word spoken by the user. Then, the setting adjustment mapped to the word is performed.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for icon based application control, comprising:

receiving, by a processor, a detection signal indicative of a pre-defined user action on an icon representing an application in a graphical user interface (GUI);

determining, based on the received detection signal, whether to execute the application or to change adjustable settings of the application;

upon determining to change the adjustable settings, extracting adjustable settings of the application; and providing, by the processor, a setting interface for the icon in the GUI to enable a user in order to adjust the adjustable settings for the application to be performed via the setting interface by providing, via the GUI, a mapping of pre-defined locations in the GUI with setting adjustments to enable the user's moving reaction of the icon located at the center of the GUI to one of the pre-defined locations, the pre-defined locations including at least four different locations located at the four cardinal directions from the icon, (i) a first of the at least four different locations, upon selection, enables or disables notification, (ii) a second of the at least four different locations, upon selection, enables or disables data network, (iii) a third of the at least four different locations, upon selection, enables or disables privacy access, and (iv) a fourth of the at least four different locations, upon selection, clears a default value.

2. The method of claim 1, wherein providing, by the processor, the setting interface for the icon in the GUI to enable the adjustments of the settings for the application to be performed via the setting interface further comprises:

providing a popup menu in association with the icon in the GUI to enable the adjustments of the settings for the application to be performed via the popup menu.

3. The method of claim 1, wherein providing, by the processor, the setting interface for the icon in the GUI to enable the adjustments of the settings for the application to be performed via the setting interface further comprises:

providing, via the GUI, a mapping of pre-defined reactions by a user with setting adjustments to enable the setting adjustment via the pre-defined actions by the user.

4. The method of claim 3, wherein providing, via the GUI, the mapping of pre-defined reactions by the user with the setting adjustments to enable the setting adjustments via the pre-defined actions by the user further comprises at least one of:

providing a mapping of pre-defined gestures in the GUI with the setting adjustments to enable the setting adjustments via gesture detection; and providing a mapping of pre-defined voices with the setting adjustments to enable the setting adjustments via voice recognition.

5. An electronic device, comprising:

a memory configured to store applications with associated settings; and a processor configured to receive a detection signal indicative of a pre-defined user action on an icon representing an application in a graphic user interface (GUI), determine, based on the received detection signal, whether to execute the application or to change adjustable settings of the application, upon determining to change the adjustable settings, extract adjustable settings of the application, and provide a setting interface for the icon in the GUI to enable a user in order to adjust the adjustable settings for the application to be performed via the setting interface by providing, via the GUI, a mapping of pre-defined locations in the GUI with setting adjustments to enable the user's moving reaction of the icon located at the center of the GUI to one of the pre-defined locations, the pre-defined locations including at least four different locations located at the four cardinal directions from the icon, (i) a first of the at least four different locations, upon selection, enables or disables notification, (ii) a second of the at least four different locations, upon selection, enables or disables data network, (iii) a third of the at least four different locations, upon selection, enables or disables privacy access, and (iv) a fourth of the at least four different locations, upon selection, clears a default value.

6. The electronic device of claim 5, further comprising:
a display configured to receive signals generated from the processor and provide the GUI according to the received signals.

7. The electronic device of claim 6, further comprising:
an user input component configured to generate detection signals in response to user reactions, and provide the detection signals to the processor.

8. The electronic device of claim 6, wherein the display is configured to generate detection signals in response to user reactions on the display, and provide the detection signals to the processor.

9. The electronic device of claim 5, wherein the processor is configured to provide a popup menu in association with the icon in the GUI to enable the adjustments of the settings for the application to be performed via the popup menu.

10. The electronic device of claim 5, wherein the processor is configured to provide, via the GUI, a mapping of pre-defined locations in the GUI with setting adjustments to enable a moving reaction of the icon to one of the pre-defined locations.

11. The electronic device of claim 5, wherein the processor is configured to provide, via the GUI, a mapping of pre-defined gestures in the GUI with the setting adjustments to enable the setting adjustments via gesture detection.

12. The electronic device of claim 5, wherein the processor is configured to provide a mapping of pre-defined voices with the setting adjustments to enable the setting adjustments via voice recognition.

13. A non-transitory computer readable medium storing program instructions for causing a processor to execute operations for icon-based application control, the operations comprising:

receiving a detection signal indicative of a pre-defined user action on an icon representing an application in a graphical user interface (GUI);
determining, based on the received detection signal, whether to execute the application or to change adjustable settings of the application;
upon determining to change the adjustable settings, extracting adjustable settings of the application; and
providing a setting interface for the icon in the GUI to enable a user in order to adjust the adjustable settings for the application to be performed via the setting interface by providing, via the GUI, a mapping of pre-defined locations in the GUI with setting adjustments to enable the user's moving reaction of the icon located at the center of the GUI to one of the pre-defined locations, the pre-defined locations including at least four different locations located at the four cardinal directions from the icon, (i) a first of the at least four different locations, upon selection, enables or disables notification, (ii) a second of the at least four different locations, upon selection, enables or disables data network, (iii) a third of the at least four different locations, upon selection, enables or disables privacy access, and (iv) a fourth of the at least four different locations, upon selection, clears a default value.

14. The non-transitory computer readable medium of claim 13, wherein the operation of providing the setting interface for the icon in the GUI to enable the adjustments of the settings for the application to be performed via the setting interface further comprises at least one of:
providing a popup menu in association with the icon in the GUI to enable the adjustments of the settings for the application to be performed via the popup menu;
providing a mapping of pre-defined gestures in the GUI with the setting adjustments to enable the setting adjustments via gesture detection; and
providing a mapping of pre-defined voices with the setting adjustments to enable the setting adjustments via voice recognition.

* * * * *